US008301570B2

(12) United States Patent
Sathyan et al.

(10) Patent No.: US 8,301,570 B2
(45) Date of Patent: Oct. 30, 2012

(54) METHOD AND SYSTEM FOR DATA SECURITY IN AN IMS NETWORK

(75) Inventors: Jithesh Sathyan, Kollam (IN); Naveen Krishnan Unni, Bangalore (IN)

(73) Assignee: Infosys Technologies Limited (IN)

( * ) Notice: Subject to any disclaimer, the term of this patent is extended or adjusted under 35 U.S.C. 154(b) by 657 days.

(21) Appl. No.: 12/290,123

(22) Filed: Oct. 27, 2008

(65) Prior Publication Data

US 2009/0133103 A1 May 21, 2009

(30) Foreign Application Priority Data

Oct. 29, 2007 (IN) .......................... 2455/CHE/2007

(51) Int. Cl.
*G06F 21/00* (2006.01)
*G06F 7/04* (2006.01)
*H04L 29/06* (2006.01)

(52) U.S. Cl. ............ 705/56; 705/51; 705/904; 705/907; 726/10; 726/26; 726/29; 709/231

(58) Field of Classification Search .................... 726/26; 705/56

See application file for complete search history.

(56) References Cited

U.S. PATENT DOCUMENTS

| 7,231,516 | B1 * | 6/2007 | Sparrell et al. ................ 713/156 |
| 7,447,775 | B1 * | 11/2008 | Zhu et al. ...................... 709/226 |
| 2003/0001880 | A1 * | 1/2003 | Holtz et al. .................... 345/716 |
| 2003/0061477 | A1 * | 3/2003 | Kahn et al. .................... 713/150 |
| 2003/0131353 | A1 * | 7/2003 | Blom et al. ...................... 725/25 |
| 2004/0168184 | A1 * | 8/2004 | Steenkamp et al. ............. 725/31 |
| 2005/0086501 | A1 * | 4/2005 | Woo et al. ...................... 713/189 |
| 2005/0286546 | A1 * | 12/2005 | Bassoli et al. ................. 370/432 |
| 2006/0282783 | A1 * | 12/2006 | Covell et al. .................. 715/744 |
| 2007/0094691 | A1 * | 4/2007 | Gazdzinski ...................... 725/62 |
| 2008/0064490 | A1 * | 3/2008 | Ellis ................................ 463/25 |
| 2008/0127255 | A1 * | 5/2008 | Ress et al. ...................... 725/38 |
| 2009/0015660 | A1 * | 1/2009 | Vedantham et al. ......... 348/14.09 |
| 2009/0100147 | A1 * | 4/2009 | Igarashi ........................ 709/218 |
| 2009/0132823 | A1 * | 5/2009 | Grimen et al. ................ 713/171 |

FOREIGN PATENT DOCUMENTS

WO   WO2007102550 A1 *  9/2007

* cited by examiner

*Primary Examiner* — Jamie Kucab
*Assistant Examiner* — Aaron McIntyre
(74) *Attorney, Agent, or Firm* — Lerner, David, Littenberg, Krumholz & Mentlik, LLP (57) ABSTRACT

A method and system to enhance the protection of the data in an user equipment and secure real time streaming of the data in the user equipment is disclosed. The method and system includes sending request by at least one user to access at least one application server. The user is provisioned to download a appropriate CMSC and a mapper into the user equipment from the application server. The method and system further comprises user sending request via an IMS network to download a data to the user equipment. The data is encrypted in the application server and is downloaded into the user equipment. The mapper identifies the appropriate CMSC, which may decrypt the data. Further, the data undergoes double decryption in real time within the user equipment before being presented in user interface. The double decryption is provisioned using the valid CMSC downloaded in the user equipment.

22 Claims, 5 Drawing Sheets

METHOD AND SYSTEM FOR DATA SECURITY IN AN IMS NETWORK

BACKGROUND OF THE INVENTION

The present invention relates to a data security, and more particularly, to a method for enhancing the protection of the data in a user equipment and secure real time streaming of the data in the user equipment using a Real Time Protocol (RTP) or a Real Time Control Protocol (RTCP).

The rapid spread in usage of an Internet Protocol (herein referred as IP) network based access technologies as well as the move towards a core network convergence with an IP Multimedia Subsystem (herein referred as "IMS") network has lead to an outburst in a multimedia data content delivery across the network. Thus, this transition in usage of the IMS network for the multimedia data content delivery has lead to a much wider and richer service experience to a user(s). However, there is also increased concern related to the multimedia data content protection and a secure delivery of the content that is sent over the IMS network in a digital form.

To address the above mentioned concerns an Open Mobile Alliance (herein referred as "OMA") has come up with most comprehensive approach with the recent release of a Digital Rights Management (herein referred as "DRM") Version-2.0 (herein referred as "V-2.0"). The feature highlighted in the DRM V-2.0 is an enhanced key management. The enhanced key management uses a trust and security model providing necessary authentication measures both at an user equipment and an application server for the multimedia data content protection and delivery. However, the trust and security model devised in the enhanced key management is based on the assumption that a DRM agent on the user equipment will always be well behaved. Also, the trust and security model of the enhanced key management authenticates the user equipment and the application server for protection and secure delivery of the multimedia data content and there is inadequate security measures implemented to protect and deliver the multimedia data content on the user equipment while transferring the data to a media player and to prevent the user from illegally transferring the data to another user.

Thus, there is a need for a method for enabling an added level of security and multimedia data content protection before the data gets played by an application on the user equipment.

SUMMARY OF THE INVENTION

In one embodiment of the present technique, a method to perform a secure real time streaming of a data over a network is disclosed. The method includes enabling a multiple user equipment(s) to download a custom media streaming client (herein referred as "CMSC") from a CMSC module of a multiple application server(s). The method further comprises downloading a mapper from a mapper module in one or more application servers into the multiple user equipments. Further, the method comprises allowing the multiple user equipments to establish the network connection with one or more application servers to download a data from a data module in the multiple application servers. The method further includes the mapper, downloaded in the multiple user equipments to identify the appropriate CMSC to decrypt the data. Further, upon successful identification of the appropriate CMSC the data is stored in a buffer of the CMSC. The method includes provisioning the CMSC to perform a first decryption of the data. The method further includes the CMSC to perform a second decryption of the data and stream the data to a user interface of the multiple user equipments.

In another embodiment of the present technique, the method to perform the secure real time streaming of the data over the network comprises encrypting the data in the multiple application servers with a validation coupon and a service coupon before downloading the data into the multiple user equipments In yet another embodiment of the present technique, the system configured to perform a secure real time streaming of a data over the network is disclosed. The system comprises an application server and an user equipment. The application server further comprises a CMSC module allowing multiple user equipments to download a CMSC into the multiple user equipments. Further, the application server comprises a mapper module allowing the multiple user equipments to download a mapper. The application server of the system further comprises an encrypter to encrypting the data with a validation coupon and a service coupon. Further, the application server comprises a data module to allow multiple user equipments to download a data. The user equipment of the system further comprises downloaded mapper to identify the appropriate CMSC to decrypt the downloaded data with in the user equipment. Further, the downloaded CMSC with in the user equipment comprises a first decryptor and a second decryptor. The first decryptor decrypts the data using a validation coupon and the second decryptor decrypts the data using the service coupon. Further, on successful second decryption the data is transferred to a user interface to present to one or more user.

BRIEF DESCRIPTION OF THE DRAWINGS

The above mentioned features as well other features, aspects, and advantages of the present invention will become better understood when the following detailed description is read with reference to the accompanying drawings in which like characters represent like parts throughout the drawings, wherein.

DETAILED DESCRIPTION

The following description is full and informative description of the best method and system presently contemplated for carrying out the present invention, which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

The present invention relates to provide a secure environment for streaming a data over a network in particular for a secure real time streaming of data in an user equipment.

The following description is presented to enable a person of ordinary skill in the art to make and use the invention and is provided in the context of the requirement for obtaining a patent. The description is the presently best contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest cope consistent with the principles and features described herein.

Figure 1:
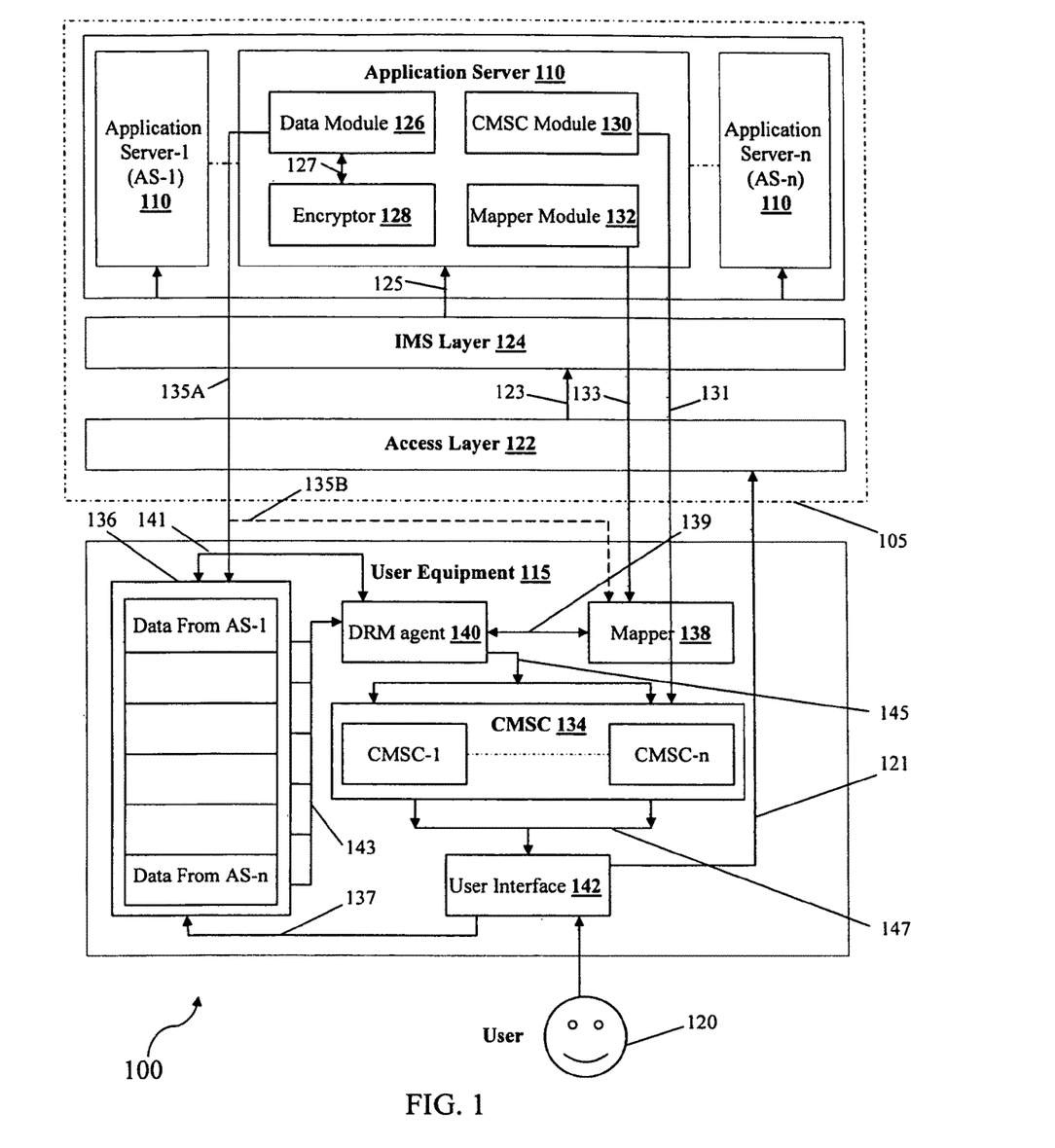
FIG. 1 is a block diagram of a system showing a number of devices configured for a secure real time streaming of a data over a network, according to one possible embodiment of the present technique.

Referring to the figures, FIG. 1 is a block diagram depicting a system 100 to perform a secure real time streaming of a data over a network 105. The system comprises a multiple number of application servers 110, (herein referred as "application servers") a multiple number of user equipments 115 (herein referred as "user equipments") and a plurality of users 120 (herein referred as "users"). The users 120 interacting with the application servers 110 using the user equipments 120 are detailed largely in the subsequent sections to follow.

In one embodiment of the present technique, the network 105 to perform the secure real time streaming of the data may be an internet protocol (IP) based network, which includes at least one of an IP multimedia subsystem network (herein referred as "IMS network"), or a packet based network (herein referred as "packet network"). However, it will be apparent to one skilled in the art that the network 105 employed for the secure real time streaming of the data may be any suitable one without deviating from the scope of the present technique.

The IMS network mentioned in the present technique is a standardized next generation networking architecture. The IMS network uses an open standard IP protocols as defined by an Internet Engineering Task Force (herein referred as "IETF"). The IP protocols defined by the IETF provisions a multimedia session or content exchange between the two users 120 on IMS network or between the user 120 on the IMS network and an internet or between the two users 120 on the internet using the same protocol.

The IMS network may comprise three layers: a service layer (not shown in FIG. 1 for clarity purpose), an access layer 122 (also known as "transport layer") and an IMS layer 124 (also known as "control layer"). The service layer of the IMS network comprises multiple numbers of the application servers 110 (for clarity purpose only one application server 110 is considered for detailing the present technique) enabling a service provider (also know as "content provider", not shown in FIG. 1 for clarity purpose) to roll a new service or a content or a data (for example rolling a multimedia file or a conference data for the secure real time streaming) in the respective application servers 110. This feature provisions each of the users 120 to connect the application servers 110 for accessing the content or the service using their respective user equipments 115.

The access layer 122 or the transport layer is responsible for initiating and terminating session initiation protocol (herein referred as "SIP"), and it provides the multimedia contents either in a digital format or in an analog format or an IP packet format to the users 120. The access layer 122 allows the communication between the components of the IMS network 105 and the user equipments 115 through a real time protocol (herein referred as "RTP") or a real time communication protocol (herein referred as "RTCP"). In one embodiment of the present technique, a request from the user equipment may be encrypted and then send to access layer 122 as represented by reference numeral 121. However, it will be apparent to one skilled in the art that the present invention may be practiced without the specific details. In other instances, different well-known features are omitted or simplified in order not to obscure the illustrative embodiments.

The IMS layer 124 or the control layer comprises a call session control function (herein referred as "CSCF", not shown in FIG. 1 for clarity purpose) and a home subscriber server (herein referred as "HSS", not shown in FIG. 1 for clarity purpose). The CSCF referees to a SIP servers and it handles the SIP registration of the application servers 110 and process the SIP messaging of the appropriate application servers 110 in the service layer. The HSS database stores a unique service profile for each of the users 120. The service profile may include the users 120 IP address, a telephone records, a friend lists, a voice mail greetings etc. In one embodiment of the present technique, the request sent to the IMS layer 124 from the user equipments 115 through the access layer 122 is processed in the HSS database as represented by reference numeral 123 to provide a unified benefit to the users 120. The unified benefit includes creating a personal directories and a centralized user data administration across all services provided by the IMS network. However, it will be apparent to one skilled in the art that the IMS layer 122 may comprise other components, which are omitted or simplified in order not to obscure the illustrative embodiments.

The packet network mentioned in the present technique may be the network 105, where transfer of a data or a voice or a media or combinations thereof is performed using IP packets. However, it will be apparent to one skilled in the art that the present technique may be practiced without the specific details on the packet networks. The scope of the present technique should not be limited in light of the disclosed packet network.

In one embodiment of the present technique, the application servers 110 comprises a data module 126, an encrypter 128, a custom media streaming client (herein referred as "CMSC") module 130, and a mapper module 132. However, it will be apparent to one skilled in the art that the application servers 110 employed for the secure real time streaming of data may comprise other components, which are omitted or simplified in order to avoid obscuring of the illustrative embodiments. The scope of the application servers 110 should not be limited in light of the present technique.

The service provider or content provider rolls the service or the content or the data in the specific application servers 110. The service provider and the content provider may be either different or the same. If the content provider is different, at times, the content provider may seek access of the service provider to roll their content or data in conference control module 128 of the application servers 110.

In one embodiment of the present technique, the request received from the IMS layer 124 to the application servers 110 is as represented by reference numeral 125. The request 125 received from the IMS layer 124 may be routed to the specific module of the application servers 110 depending upon the type of the request 125 received by the user equipments 115 through the IMS layer 124.

The data module 126 of the application servers 110 is configured to manage the data. Typically, the service provider or the content provider rolls the data in the data module 126. The data rolled on the data module 126 of the application servers 110 may be a multimedia file or an audio conferencing file, or a video conferencing file or a data conferencing file or combination thereof. The request 125 received to download the data rolled in the application servers 110 are handled in the data module 126. Upon receipt of such request 125 the data is sent to the encrypter 128 as represented by reference numeral 127 for encryption of the data.

The encrypter 128 in the application servers 110 is configured to encrypt the data using a validation coupon and a service coupon. The validation coupon may comprise an equipment identity (herein referred as "device id") or a person identity (herein referred as "public id") or combination of both. The user equipments 115 upon successful registration of a SIM card in the user equipments 115 may provide the device id and the content provider may provide the public id for each of the application servers 110 resided in the service layer of the IMS network. The service coupon may be a unique key specific to each of the application servers 110. It may be used as the application servers 110 identifier from which the data is downloaded into the user equipments 115.

On successful encryption of the data by the encrypter 128 the data is sent back to the data module 126 as represented by reference numeral 127. The data module 126 downloads the data into a download module 136 of the user equipments 115 as represented by the reference numeral 135A. The data downloaded from the data module 126 of the application server 110 is registered in the mapper 138. The mapper 138 registry is accomplished to enter the relation between the data being downloaded into the download module 136 of the user equipments 115 from the application servers 110 as represented by reference numeral 135B.

In one embodiment of the present technique, the CMSC module 130 of the application servers 110 provisions the user equipments 115 to download the CMSC 134 into the user equipments 115 as represented by reference numeral 131. The CMSC module 130 initially identifies the availability of the valid CMSC 134 in the user equipments 115 through service coupon as provided by the content provider or service provider in the specific application servers 110. The service coupon may be a unique key comprising a numeral or alphabet or special character or combination thereof. The unique key are specific to the content provider or the service provider and the unique key is know only to the CMSC 134 downloaded from the appropriate application servers 110 rolling the secure real time streaming data. The CMSC module 130 may further comprises intimating users 120 about the presence of a valid CMSC 134 in the respective user equipments 115 and further comprises intimating users 120 to download the valid CMSC 134 from the CMSC module 130 into the respective user equipments 115 in absence of the valid CMCC 134. The CMSC module 130 may intimate the users 120 by sending a message to the respective user equipments 115 stating the reason.

In one embodiment of the present technique, the mapper module 132 of the application servers 110 provisions the user equipments 115 to download the mapper into the user equipments 115 as represented by reference numeral 133. The mapper module 132 initially identifies the availability of the valid mapper 138 in the user equipments 115 through service coupon as provided by the content provider or service provider in the specific application servers 110. The service coupon may be a unique key comprising a numeral or alphabet or special character or combination thereof. The unique key are specific to the content provider or the service provider and the unique key is know only to the mapper 138 downloaded from the appropriate application servers 110 rolling the secure real time streaming data.

In one embodiment of the present technique, the user equipments 115 comprises the CMSC 134, the download module 136, the mapper 138, a digital rights management (herein referred as a "DRM") agent 140, and a user interface 142. The CMSC 134 further comprises a buffer 202, a validator decryptor 204, and a service decryptor 206 (referring to FIG. 2). However, it will be apparent to one skilled in the art that the user equipments 115 used to perform the secure real time streaming of the data may comprise other components, which are omitted or simplified in order to avoid obscuring of the illustrative embodiments. The scope of the user equipments 115 should not be limited in light of the present technique.

The DRM agent 140 of the user equipments 115 enforces a plurality of rights on the data downloaded into the user equipments 115. The rights may be enforcing number of a parameters set by the service provider or the content provider in the user equipments 115 or enforcing number of a mandatory parameters set in an open mobile alliance (herein referred as "OMA") DRM or combination thereof. The parameters set by the service provider or the content provider may be a number of hours, days, or months the data is valid for use by the users 120 or number of times the data may be accessed by the users 120 or whether the data is a demo version or a full version etc. The mandatory parameters set by the OMA DRM may be restriction imposed to forward the conference data downloaded into the plurality of user equipments 115 to any another user equipments 115. Further, the mandatory parameters may be restriction imposed on a combined download of the data into multiple user equipments 115 or inquiring whether a reconnection is essential from the user equipments 115 to the application servers 110 to download the conference data or etc. The DRM agent 140 may be build-in the user equipments 115.

In one embodiment of the present technique, DRM agent 140 is launched on the user equipments 115, when the data is accessed by the user 120 through the user interface 142. The download module 136 sends the request to the DRM agent 140 as represented by the reference numeral 141. The DRM agent 140 in turn sends the request to the mapper 138 to identify the appropriate CMSC 134 to decrypt the data, as represented by reference numeral 139. The DRM agent 140 communicates the details with the download module 136 and the download module 136 transmits the data to the DRM agent 140 for further processing. The data may be unpackaged by the DRM agent 140, and is stored in the encrypted format in the buffer 202 of the CMSC 134, as represented in the reference numeral 145. However, it will be apparent to one skilled in the art that the DRM agent 140 in the user equipments 115 may perform other necessary functionality as compiled in the 3$^{rd}$ Generation Partnership Project 3GPP, which are omitted or simplified in order to avoid obscuring of the illustrative embodiments. The functionality of DRM Agent 140 illustrated should not be restrictive without deviating from the scope of the present technique.

The mapper 138 comprises a register to enter the relation between the data being downloaded from the application servers 110 and the appropriate CMSC 134 to decrypt the data. The relation between the data may be registered in a log entry or a table entry or combination of both. Thus the mapper 138 provisions necessary information to the DRM agent 140 to enable the DRM agent 140 to send the data to the appropriate CMSC 134 for further processing.

The CMSC 134 downloaded into the user equipments 115 provisions the users 120 to decrypt the data downloaded into the user equipments 115 and stream the data in real time to the user interface 142. In one embodiment of the present technique, (referring to FIG. 2) the buffer 202 of the CMSC 134 is used to store the data before decryption. The validator decryptor 204 is used to perform first decryption of the data using the validation coupon as provided by the user equipment during encryption of the data. The service decryptor 206 is used to perform the second decryption of the data using a service coupon as provided the service provider or the content provider of the specific application servers 110. In addition, the CMSC 134 may encrypt the request sent from the user equipments 115 to the applications server 110.

Figure 2:
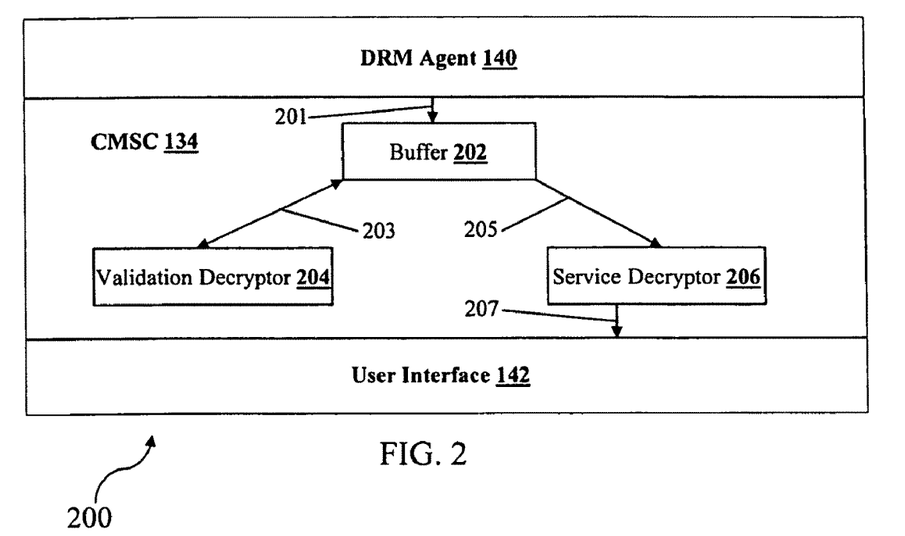
FIG. 2 is a block diagram of a system illustrating the number of components configured for streaming the data within an user equipment, according to one embodiment of the present technique.

The user interface 142 of the user equipments 115 presents the data to the users 120 after been decrypted and streamed from the service decryptor 206 of the CMCC 134, as represented by the reference numeral 147. The user interfaces 142 forms a part of the user equipments 115; however, it may even be separated out from the user equipments 115. The user interface 142 may be a third party interface or an interface provided by the data module 126. The third party user interface 142 may be a real player or a media player etc. However, it will be apparent to one skilled in the art that the user interface 142 employed to present the conference data may be any suitable one without deviating from the scope of the present technique. The scope of the present technique should not be limited in light of the user interface 142.

The user equipments 115 used in the secure conference may be a mobile device, a personal digital assistant (PDA) device, a laptop, a fixed device, or combinations thereof. However, it will be apparent to one skilled in the art that the user equipments 115 employed for secure conference may be any suitable one without deviating from the scope of the present technique.

FIG. 2 shows the block diagram of the system 200 illustrating the multiple components configured for streaming the data within an user equipment. The DRM agent 140 stores the data in the buffer 202 of the CMSC 134, as represented by the reference numeral 201. The CMSC 134 sends the data to the validator decryptor 204 to undergo a first decryption of the data using the validation coupon, as represented by the reference numeral 203. The validation coupon is provided to the CMSC 134 by the application servers 110 during downloading the data to the user equipments 115. The validation coupon comprises a user identity (herein referred as "public id") and a equipment identity (herein refereed as "device id"). The public id may be unique number assigned to the specific user 120 by the content provider or the service provider to identify the user 115, while trying to access the application servers 110. The device id may also be a unique key specific to the uses' 120 user equipment 115. The device id may be registered by the user 120 in the application servers 110 while downloading the data. After the validator decryptor 204 successfully decrypts the data, the data is stored back in the buffer 202. The CMSC 134 later sends the data to the service decryptor 206 for a second decryption as represented by the reference numeral 205. The service decryptor 206 decrypts the data using the service coupon and streams the data to the user interface 142, as represented by the reference numeral 207. The service coupon may be a unique key specific to each of the content provider or the service provider rolling their service in the specific application servers 110. The service coupon is used the encrypter 128 to encrypt the data while the user 120 tries to download the data into the user equipments 115.

The user interface 142 may present the streamed data from the service decryptor 206. The user interface 142 may be a part of the user equipment 115 or the user interface 115 may be separated out as a separate component.

Figure 3:
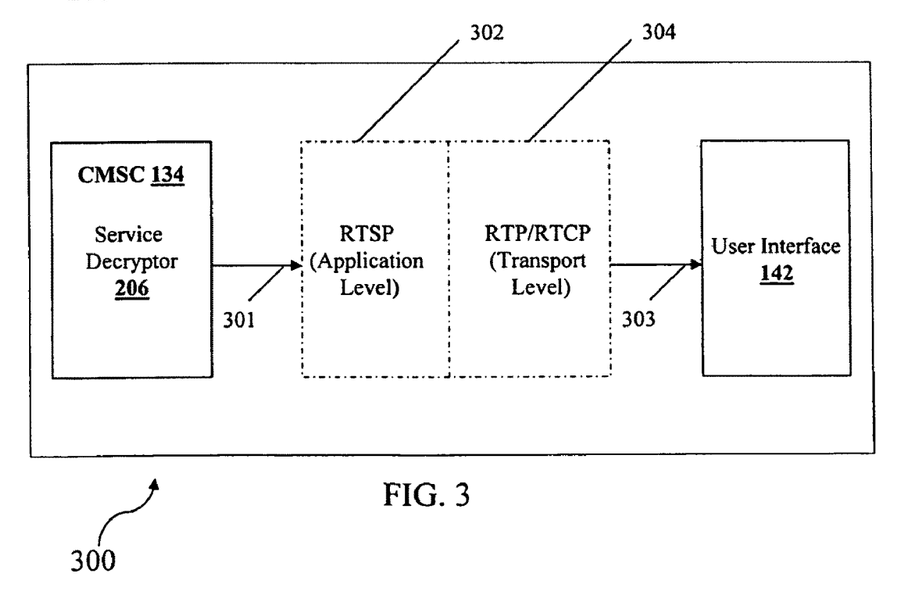
FIG. 3 is a block diagram of a system illustrating the secure real time streaming of the data through a service decryptor of the user equipment, according to one embodiment of the present technique.

FIG. 3 represents the block diagram of the system 300 illustrating the secure real time streaming of the data through a service decryptor 206 of the user equipments 115. The data is streamed from the service decryptor 206 to the user interface 142 using a Real Time Steaming Protocol (herein referred as "RTSP") 302, as represented by a reference numeral 301 and 303. The streaming of the data is also handled using a Real Time Control Protocol 304 (herein referred as "RTCP") or a Real Time Protocol 304 (herein referred as "RTP"). The RTP/RTCP 304 or RTSP 302 protocols are more stable than the other protocols for data delivery and streaming. The RTSP 302 protocol is an application-level protocol providing the user 120 to control the streaming of data by using various control commands like a play and a pause and etc. The RTSP 302 protocol also allows the user to have a time based access to the data on the user equipments 115. The RTP or RTCP 304 is a transport level protocol. The RTP or RTCP protocol gathers statistics on a data connection and other information such as a byte(s) sent, a packet(s) sent, a lost packet(s), a jitter, and a round trip delay and etc.

Figure 4:
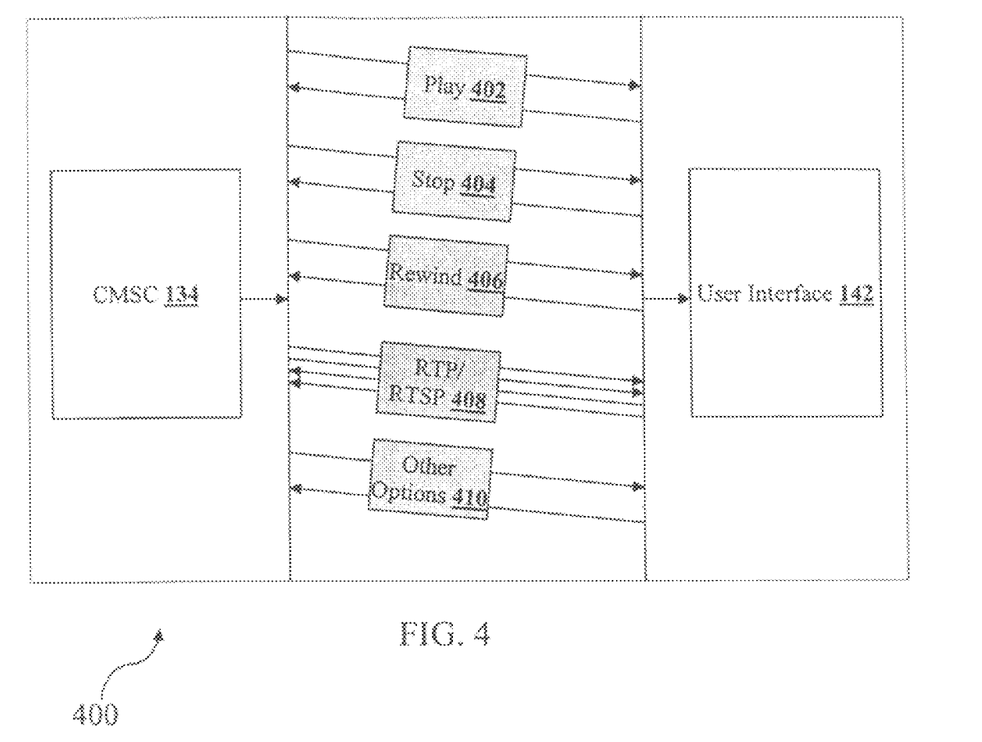
FIG. 4 is a block diagram of a system showing a CMSC streaming the data to an user interface within the user equipment, in one embodiment of the present technique.

FIG. 4 represents the block diagram of the system 400 showing the CMSC 134 streaming the data to the user interface 142 within the user equipment 115. During the process of streaming the data, the CMSC 134 acts as a local streaming server and a user interface 142 as a client that issue commands to the local streaming server. The CMSC streams the data to the user interface 142 after second decryption of the data using a service decryptor 206. While streaming the data their may be an event of interruption. The event of interruption may include a stop function 402, a stop function 404, a rewind function 406 and other options 410 and etc. During the event of interruption while streaming the data to the user interface 142 the buffer 202 (refer FIG. 2) will be cleared. The user 120 has to again invoke the data file to work on by again invoking the DRM agent 140 to store the data into the buffer 202 of the CMSC 134. The data needs to again under the process of double decryption. The RTP protocol or the RTSP protocol 408 provides the user to control the data by using few commands like a play function 402, a stop function 404, or a rewind function 406 and other option function 410 and etc. The RTSP 408 protocol also allows the user to have a time based access to the data on the user equipments 115. The RTP 408 protocol gathers statistics on a data connection and other information such as a byte(s) sent, a packet(s) sent, a lost packet(s), a jitter, and a round trip delay and etc.

Figure 5:
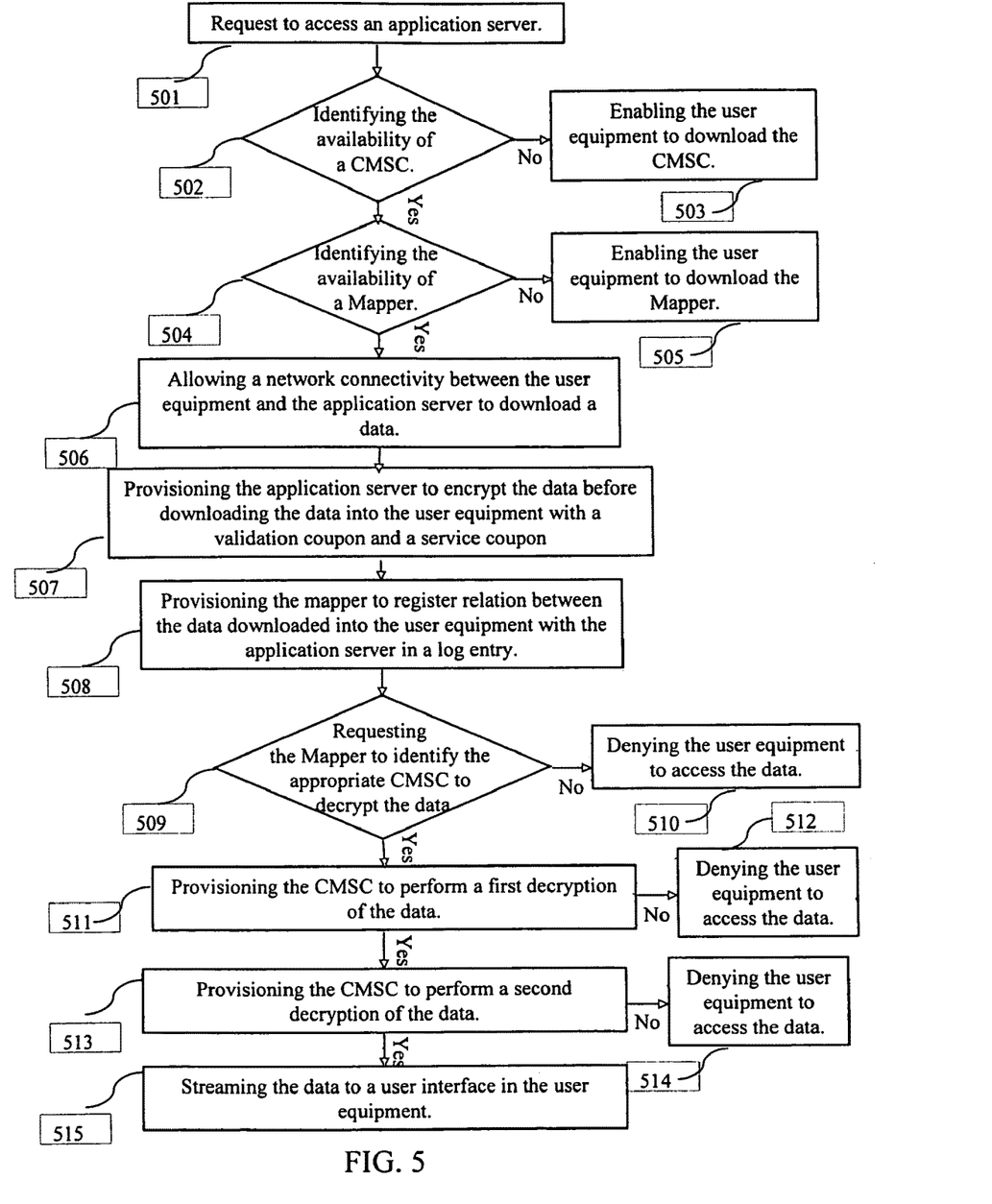
FIG. 5 is a flow diagram illustrating a method for the secure real time streaming of data over the network, according to one embodiment of the present technique.

FIG. 5 represents a flow diagram illustrating a method for secure real time streaming of the data over the network, according to one embodiment of the present technique. The method comprising: 1) making a request by at least one user to access an application servers (block 501) 2) identifying the availability of a CMSC (block 502), 3) enabling the user equipment to download the CMSC (block 503), 4) identifying the availability of a mapper (block 504), 5) enabling the user equipment to download the mapper (block 505), 6) allowing a network connectivity between the user equipment and the application server to download a data (block 506), 7) provisioning the application server to encrypt the data before downloading the data into the user equipment with a validation coupon and a service coupon (block 507), 8) provisioning the mapper to register relation between the data downloaded into the user equipment with the application server in a log entry (block 508), 9) requesting the mapper to identify the appropriate CMSC to decrypt the data (block 509), 10) denying the user equipment to access the data (block 510), 11) provisioning the CMSC to perform a first decryption of the data (block 511), 12) denying the user equipment to access the data (block 512), 13) provisioning the CMSC to perform a second decryption of the data (block 513), 14) denying the user equipment to access the data (block 514), and 15) Streaming the data to a user interface in the user equipment (block 515). Each of the steps will be explained in greater extent in the subsequent sections as follows.

In step 501, the user makes a request to access the application servers to either to access the data or see the information rolled in the application servers. Thereafter, the users' user equipment is checked to find the availability of the CMSC as represented in step 502. If the user equipment does not comprise an appropriate CMSC, the user is prompted to download the CMSC to access the data as represented in step 503. The user equipment is further checked to find the availability of the mapper as represented in step 504. If the user equipment does not comprise the mapper, the user is prompted to download the mapper from the application server as represented in step 505.

In step 506, the network connection is established between the user equipments and the application servers to download the data into the user equipments. Before downloading the data into the user equipments the data is double encrypted with a validation coupon and a service coupon by a encrypter with in the application servers as represented in step 507. While the data is downloaded into the user equipment after double encryption a register entry is made in the downloaded mapper to identity the data against appropriate CMSC to decrypt later as represented in step 508. Once the user tries to access the data, the request is sent to the mapper to identify the appropriate CMSC, which may decrypt the data, as represented by the step 509. If the mapper is unable to identify the appropriate CMSC to decrypt the data the user is denied to access the data, as represented in the step 510. Upon successful identification of the appropriate CMSC, the data undergoes the first decryption by the validator decryptor using a validation coupon, as represented in step 511. If the CMSC is unsuccessful in performing a first decryption the user is denied to access the data, as represented in step 510. On successful first decryption the data is processed further for a second decryption through a service decryptor using a service coupon as represented in step 513. If the CMSC is unsuccessful in performing the second decryption the user is denied to access the data, as represented in step 514. On successful second decryption the data is streamed to an user interface, as represented in step 515.

With a fixed mobile convergence [FMC] in IMS network, a shared key may be introduced in future so that the particular users 120 may access the data on the multiple devices where the validation coupon may be the key shared across the devices in which conference application is accessed.

While the present invention has been related in terms of the foregoing embodiments, those skilled in the art will recognize that the invention is not limited to the embodiments depicted. The present invention may be practiced with modification and alteration within the spirit and scope of the appended claims. Thus, the description is to be regarded as illustrative instead of restrictive on the present invention.

In one of the exemplary embodiment, the present technique may be illustrated by representing the steps involved by a user trying to access the application server over the IMS network.

The user browses a content section of the specific application server and requests to access the particular content or data, which is been rolled in the application server. In the application server the users' user equipment is checked whether it comprise an appropriate CMSC to access the data. If the user equipment does not comprise the appropriate CMSC the user is prompted to download the appropriate CMSC. Later, the user equipment is also checked whether the user equipment comprise a mapper. If the user equipment does not comprise the mapper the user is prompted to download the mapper. A network connection is established between the user equipment and the application allowing the user to download the data, which the user is requested for. The data in the application server undergoes a double encryption by an encrypter before downloading to the user equipment. A first encryption is accomplished using a validation coupon by the encrypter. The validation coupon comprises a public id and a device id. The public id is the unique key as provided by the application server, which is specific to each user. The device id is the user equipment identity number, using which the user is trying to access the data rolled in the application server. The second encryption is accomplished using a service coupon by the encrypter. The service coupon is a unique key specific to the service provider or a content provider specific to the application servers where the services are rolled. After double encryption of the data, the data is downloaded into the user equipment, while downloading a register entry is made in the downloaded mapper within the user equipment, to later identify the data from which application server is being downloaded. On successful download of the data, when the user tries to open the data, a request is sent to the mapper by the DRM agent to identity the appropriate CMSC to decrypt the data. The mapper sends the information about the appropriate CMSC to the DRM agent. The DRM agent stores the data into a buffer of the appropriate CMSC. The CMSC forward the data from the buffer to the validator decryptor to undergo the first decryption of the data. The validator decryptor uses the public id and the device id information to decrypt the data at the first level. The first decrypted data is stored back in the buffer. The CMSC further sends the data to the service decryptor to undergo the second decryption of the data using a service coupon. On successful second decryption of the data, the data is streamed in real time to a user interface using the RTP or RTSP protocol. The user interface may be an integrated one to the user equipment or may be separate one.

In the event of interruption by the user during the data is streamed in real time from the service decryptor to the user interface the buffer is cleared and as further command is received from the user the whole process of storing back the data into the buffer from the DRM agent and double decryption of the data is initiated from the beginning. The RTSP protocol handles the control command from the user during playing the data. While the RTP protocol records the statistics on a data connection and other information related to the data.

The data from the service decryptor is streamed to the user interface in real time, which includes streaming continuously only few bytes of data which may be played only for few seconds. The usage of double decryption of the data make the CMSC light weight in term of time consumption and efficient for streaming the data in real time.

The key functionality disclosed in the present technique enables certain drawbacks which may be incurred in the user equipment. Primarily the inventive step disclosed overcomes the scenario when the DRM Agent available in the user equipment is not functioning properly. Then there is a possibility of ripping data before the data gets played on the media player. With the introduction of a Custom Media Streaming component on the User device, the service/content provider is fully assured on the use of the content and has full control over the content he provides, since the custom Media Stream component (supplied by the content provider) is the only component that can decrypt the media file, and since it streams the data only in real-time, ripping/encoding will happen only in real-media-time. The custom Media Streaming component may also be used to collect information like "how many times has the song been listened to". Thus the media file like demo/sample versions downloaded to the user equipment may be controlled appropriately, which are currently handled by the DRM Agent. Thus providing the clear control to service provider without having to rely on the DRM Agent provided in the user equipment which may not provided from the service provider. The user and equipment level identification may be achieved here using the security keys. A properly functioned DRM agent may refuse to play the file if the media does not belong to the intended user. With CMSC it makes the encryption algorithm used even more rigid by having public id along the device id in encryption. From a law-enforcement perspective, when the user illegally transfers the media file to another user, if the file is intercepted/found published somewhere on the net, the content provider will be able to track down the originator of the file, and institute appropriate action. Hence this would be a kind of water marking of the user who originally downloaded the file and is the correct owner of it.

Exemplary Computing Environment

Figure 6:
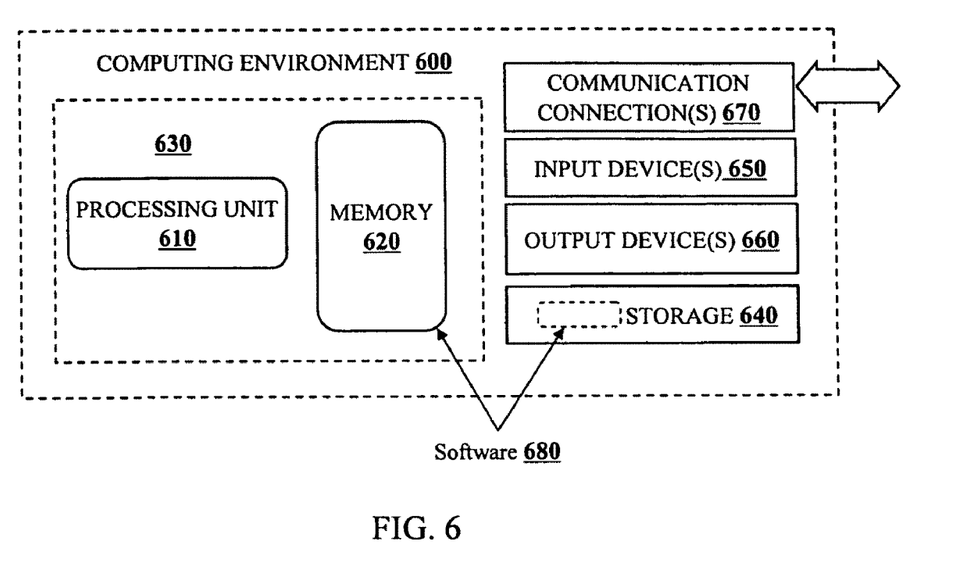
FIG. 6 is a system illustrating a generalized computer network arrangement, in one embodiment of the present technique.

One or more of the above-described techniques can be implemented in or involve one or more computer systems. FIG. 6 illustrates a generalized example of a computing environment 600. The computing environment 600 is not intended to suggest any limitation as to scope of use or functionality of described embodiments.

With reference to FIG. 6, the computing environment 600 includes at least one processing unit 610 and memory 620. In FIG. 6, this most basic configuration 630 is included within a dashed line. The processing unit 610 executes computer-executable instructions and may be a real or a virtual processor. In a multi-processing system, multiple processing units execute computer-executable instructions to increase processing power. The memory 620 may be volatile memory (e.g., registers, cache, RAM), non-volatile memory (e.g., ROM, EEPROM, flash memory, etc.), or some combination of the two. In some embodiments, the memory 620 stores software 680 implementing described techniques.

A computing environment may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other medium which can be used to store information and which can be accessed within the computing environment 600. In some embodiments, the storage 640 stores instructions for the software 680.

The input device(s) 650 may be a touch input device such as a keyboard, mouse, pen, trackball, touch screen, or game controller, a voice input device, a scanning device, a digital camera, or another device that provides input to the computing environment 600. The output device(s) 660 may be a display, printer, speaker, or another device that provides output from the computing environment 600.

The communication connection(s) 670 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 600, computer-readable media include memory 620, storage 640, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. A method to perform secure real time streaming of data over a network, the method comprising:
   requesting, using a user equipment, data corresponding to a content or service from one of one or more application servers, wherein the requested data is made available on the application server by a content provider or service provider;
   determining at the requesting user equipment, prior availability of a valid customized media streaming client (CMSC) for accessing the requested data, wherein validity of any CMSCs available at the requesting user equipment is determined based on a service coupon uniquely corresponding to the content provider or service provider;
   determining at the requesting user equipment, prior availability of a valid mapper, said mapper comprising a register having information reflecting correspondence between data received from the application server and a valid CMSC for accessing such data, wherein validity of a mapper is determined based on a key uniquely corresponding to the content provider or service provider;

sequentially performing a first and second encryption of the requested data wherein the first encryption uses one of a validation coupon and the service coupon and the second encryption uses the other of the validation coupon and the service coupon, the validation coupon comprising at least one of a unique identification assigned to a requesting user and a unique identification assigned to the requesting user equipment;

transmitting the encrypted data resulting from the sequential first and second encryption from the application server to the requesting user equipment over a network;

sequentially performing at the valid CMSC a first and second decryption of the encrypted data using respectively one and the other of the validation coupon and the service coupon; and streaming the decrypted data resulting from the sequential first and second decryption to a user interface.

2. The method as claimed in claim 1, further comprising enabling the requesting user equipment to download a valid CMSC from the application server in case of prior unavailability at the requesting user equipment.

3. The method as claimed in claim 1, further comprising enabling the requesting user equipment to download a valid mapper from the application server in case of prior unavailability at the requesting user equipment.

4. The method as claimed in claim 1, further comprising transmitting the validation coupon to the requesting user equipment over the network.

5. The method as claimed in claim 1, further comprising identifying the valid CMSC from among one or more CMSCs available on the requesting user equipment, based on the information from the valid mapper.

6. The method as claimed in claim 1, wherein the register comprises at least one of a log entry or a data table.

7. The method as claimed in claim 1, wherein the decrypted data resulting from the first decryption is stored in a buffer of the valid CMSC.

8. The method as claimed in claim 7, wherein the second decryption is performed on the decrypted data stored in the buffer of the valid CMSC.

9. The method as claimed in claim 7, wherein the buffer is entirely cleared upon any interruption event that interferes with streaming of the decrypted data to the user interface.

10. The method as claimed in claim 8, wherein the buffer is entirely cleared upon any interruption event that interferes with streaming of the decrypted data to the user interface.

11. The method as claimed in claim 9, wherein the interruption event may comprise one or more of a stopping function, pausing function, forwarding function, recording function, rewind function.

12. A system to perform a secure real time streaming of data over a network, the system comprising:

one or more application servers, each configured to provide data corresponding to content or services made available by a content provider or service provider;

one or more user equipments, each configured to request content or service data from any of the one or more application servers;

a customized media streaming client (CMSC) module configured to determine at a user equipment requesting content or service data, prior availability of a valid CMSC for accessing the requested content or service data, wherein validity of any CMSCs available at the requesting user equipment is determined based on a service coupon uniquely corresponding to a content provider or service provider responsible for making the requested content or service data available;

a mapper module configured to determine at the requesting user equipment, prior availability of a valid mapper, said mapper comprising a register having information reflecting correspondence between data received from an application server from which the content or service data has been requested and a valid CMSC for accessing such data, wherein validity of a mapper is determined based on a key uniquely corresponding to the content provider or service provider;

an encryptor configured to sequentially perform a first and second encryption of the requested data wherein the first encryption uses one of a validation coupon and the service coupon and the second encryption uses the other of the validation coupon and the service coupon, the validation coupon comprising at least one of a unique identification assigned to a requesting user and a unique identification assigned to the requesting user equipment;

a data module configured to transmit the encrypted data resulting from the sequential first and second encryption from the application server to the requesting user equipment over a network;

a digital rights management (DRM) Agent configured to request identification of the valid CMSC from among one or more CMSCs available on the requesting user equipment, based on the information from the mapper;

a decryptor configured to perform using the validation coupon, one of a sequential first and second decryption of the encrypted data received by the requesting user equipment;

a decryptor configured to perform using the service coupon, the other of the sequential first and second decryption of the encrypted data received by the requesting user equipment;

a user interface configured to receive streaming data resulting from the sequential first and second decryption.

13. The system as claimed in claim 12, wherein the CMSC module is further configured to enable the requesting user equipment to download a valid CMSC from the application server in case of prior unavailability at the requesting user equipment.

14. The system as claimed in claim 12, wherein the mapper module is further configured to enable the requesting user equipment to download a valid mapper from the application server in case of prior unavailability at the requesting user equipment.

15. The system as claimed in claim 12, wherein the DRM Agent is further configured to store the encrypted data received by the requesting user equipment in the valid CMSC.

16. The system as claimed in claim 12, wherein the user interface is further configured to present the received streaming data to the requesting user.

17. The system as claimed in claim 12, wherein at least one of the decryptors is provided within the valid CMSC.

18. The system as claimed in claim 12, wherein the valid CMSC comprises a buffer configured to store decrypted data from one or both the decryptors.

19. The system as claimed in claim 12, wherein the DRM Agent is further configured to enforce end-user rights in the requested data.

20. The system as claimed in claim 18, wherein the buffer is entirely cleared upon any interruption event that interferes with streaming of the decrypted data to the user interface.

21. The system as claimed in claim 20, wherein the interruption event may comprise one or more of a stopping function, pausing function, forwarding function, recording function, rewind function.

22. A computer program product comprising a non-transitory computer usable medium having a computer readable program code embodied therein for performing secure real time streaming of data over a network, the computer program product comprising instructions for:

requesting, using a user equipment, data corresponding to a content or service from one of one or more application servers, wherein the requested data is made available on the application server by a content provider or service provider;

determining at the requesting user equipment, prior availability of a valid customized media streaming client (CMSC) for accessing the requested data, wherein validity of any CMSCs available at the requesting user equipment is determined based on a service coupon uniquely corresponding to the content provider or service provider;

determining at the requesting user equipment, prior availability of a valid mapper, said mapper comprising a register having information reflecting correspondence between data received from the application server and a valid CMSC for accessing such data, wherein validity of a mapper is determined based on a key uniquely corresponding to the content provider or service provider;

sequentially performing a first and second encryption of the requested data wherein the first encyption uses one of a validation coupon and the service coupon and the second encryption uses the other of the validation coupon and the service coupon, the validation coupon comprising at least one of a unique identification assigned to a requesting user and a unique identification assigned to the requesting user equipment;

transmitting the encrypted data resulting from the sequential first and second encryption from the application server to the requesting user equipment over a network;

sequentially performing at the valid CMSC a first and second decryption of the encrypted data wherein the first decryption uses one of the validation coupon and the service coupon and the second decryption uses the other of the validation coupon and the service coupon; and streaming the decrypted data resulting from the sequential first and second decryption to a user interface.

* * * * *

UNITED STATES PATENT AND TRADEMARK OFFICE
CERTIFICATE OF CORRECTION

PATENT NO. : 8,301,570 B2
APPLICATION NO. : 12/290123
DATED : October 30, 2012
INVENTOR(S) : Jithesh Sathyan et al.

Page 1 of 2

It is certified that error appears in the above-identified patent and that said Letters Patent is hereby corrected as shown below:

On the Title Page
Item [57], line 2, delete the word "an"
Item [57], line 3, "is" should read --are--
Item [57], line 4, "includes" should read --include--
Item [57], line 4, "sending" should read --sending a--
Item [57], line 5, "download a" should read --download an--
Item [57], line 8, "comprises" should read --comprise--
Item [57], line 8, "sending" should read --sending a--
Item [57], line 9, "load a data" should read --load data--

In the Specification
Column 1, line 6, "to a data" should read --to data--
Column 1, line 8, "in a user" should read --in user--
Column 1, line 12, "network based" should read --network-based--
Column 1, line 24, "with most" should read --with the most--
Column 1, line 30, "both at an user" should read --both at user--
Column 2, line 8, "equipments" should read --equipments.--
Column 2, line 12, "and an user" should read --and user--
Column 2, line 23, "with in the user" should read --within the user--
Column 2, line 46, "within an user" should read --within user--
Column 2, line 53, "data to an user" should read --data to a user--
Column 2, line 64, "is full and" should read --is a full and--
Column 3, line 17, "in an user" should read --in user--
Column 3, line 29, "cope" should read --scope--
Column 3, line 42, "internet" should read --Internet--
Column 3, line 42, "(IP) based network" should read --(IP)-based network--
Column 3, line 44, "packet based" should read --packet-based--
Column 3, line 52, "protocols" should read --protocol--
Column 3, line 54, "protocols" should read --protocol--

Signed and Sealed this
Third Day of June, 2014

Michelle K. Lee
*Deputy Director of the United States Patent and Trademark Office*

CERTIFICATE OF CORRECTION (continued)
U.S. Pat. No. 8,301,570 B2

Column 3, line 57, "internet" should read --Internet--
Column 3, line 58, "internet" should read --Internet--
Column 4, line 17, "send" should read --sent--
Column 4, line 28, "to a SIP" should read --to SIP--
Column 4, line 30, "process" should read --processes--
Column 4, line 33, "address, a telephone" should read --address, telephone--
Column 4, line 34, "lists" should read --list--
Column 4, line 39, "creating a per-" should read --creating per- --
Column 4, line 54, "comprises" should read --comprise--
Column 5, line 56, "are" should read --is--
Column 5, line 57, "know" should read --known--
Column 5, line 60, "comprises" should read --comprise--
Column 5, line 62, "comprises" should read --comprise--
Column 6, line 11, "are" should read --is--
Column 6, line 12, "know" should read --known--
Column 6, line 16, "comprises" should read --comprise--
Column 6, line 30, "enforcing number" should read --enforcing a number--
Column 6, line 47, "build-in" should read --built-in--
Column 7, line 21, "provided the" should read --provided by the--
Column 7, line 29, "forms" should read --form--
Column 7, line 57, "and a equipment" should read --and an equipment--
Column 8, line 41, "their" should read --there--
Column 9, line 16, "15) Streaming" should read --streaming--
Column 9, line 36, "with in" should read --within--
Column 10, line 10, "comprise" should read --comprises--
Column 10, line 14, "comprise" should read --comprises--
Column 10, line 53, "user during the data" should read --user the data--
Column 10, line 55, "interface" should read --interface,--
Column 10, line 60, "data While the" should read --data, while the--
Column 10, line 65, "make" should read --makes--
Column 11, line 21, "not provided" should read --not be provided--

In the Claims
Column 12, line 49, "using a user" should read --using user--
Column 13, line 10, "encryption" should read --encryptions--
Column 13, line 17, "decryption" should read --decryptions--
Column 14, line 20, "encryption" should read --encryptions--
Column 14, line 32, "decryption" should read --decryptions--
Column 14, line 36, "decryption" should read --decryptions--
Column 15, line 6, "using a user" should read --using user--
Column 16, line 12, "encryption" should read --encryptions--
Column 16, line 20, "decryption" should read --decryptions--